(12) United States Patent
Stockhelm

(10) Patent No.: US 7,776,431 B2
(45) Date of Patent: Aug. 17, 2010

(54) PLASTIC PLANAR STRUCTURE COMPRISING A FOAMED UPPER LAYER

(75) Inventor: Uwe Stockhelm, Wanfried-Heldra (DE)

(73) Assignee: Derin Holzapfel & Co. Grundbesitz und Beteiligungs KG, Meinhard-Frieda (DE)

( * ) Notice: Subject to any disclaimer, the term of this patent is extended or adjusted under 35 U.S.C. 154(b) by 0 days.

(21) Appl. No.: 11/347,436

(22) Filed: Feb. 3, 2006

(65) Prior Publication Data

US 2007/0184258 A1    Aug. 9, 2007

(51) Int. Cl.
*B32B 3/30*    (2006.01)
(52) U.S. Cl. .......... 428/316.6; 428/74; 428/76; 428/156; 428/158; 428/174; 428/187; 428/195.1
(58) Field of Classification Search .......... 428/316.6, 428/76, 156, 158, 174, 187, 195.1
See application file for complete search history.

(56) References Cited

U.S. PATENT DOCUMENTS

| | | | | |
|---|---|---|---|---|
| 3,506,749 A | * | 4/1970 | Weissman | 264/102 |
| 3,857,133 A | * | 12/1974 | Linenfelser | 15/118 |
| 3,931,429 A | * | 1/1976 | Austin | 428/158 |
| 3,977,406 A | * | 8/1976 | Roth | 604/362 |
| 4,710,415 A | * | 12/1987 | Slosberg et al. | 428/48 |
| 4,901,387 A | * | 2/1990 | Luke | 5/730 |
| 5,215,691 A | * | 6/1993 | Bland et al. | 264/45.9 |
| 6,797,371 B1 | * | 9/2004 | Gehlsen et al. | 428/317.5 |
| 2001/0001283 A1 | * | 5/2001 | Kennedy et al. | 428/100 |
| 2004/0258902 A1 | * | 12/2004 | Seth et al. | 428/315.7 |
| 2005/0129897 A1 | * | 6/2005 | Zhou et al. | 428/43 |
| 2005/0136238 A1 | * | 6/2005 | Lindsay et al. | 428/304.4 |
| 2005/0166372 A1 | * | 8/2005 | Shepard et al. | 24/442 |
| 2006/0101626 A1 | * | 5/2006 | Gallant et al. | 24/442 |

FOREIGN PATENT DOCUMENTS

| | | |
|---|---|---|
| DE | 24 14862 A1 | 3/1974 |
| DE | 4342200 | 9/1994 |
| EP | 576403 A1 * | 12/1993 |
| JP | 59020656 | 7/1982 |
| JP | 4303640 | 10/1992 |
| JP | 6319660 | 11/1994 |
| JP | 10309241 | 11/1998 |
| JP | 2000170358 | 6/2000 |
| JP | 2006187928 | 7/2006 |
| WO | WO99/22633 | 5/1999 |

\* cited by examiner

*Primary Examiner*—Hai Vo
(74) *Attorney, Agent, or Firm*—RatnerPrestia

(57) ABSTRACT

A plastic planar structure, comprising: a bearing layer which contains plastic foam; and an upper layer, also containing plastic foam, which adheres on the bearing layer in a material lock, and a method for manufacturing a plastic planar structure, wherein: a foamed or foamable first plastic material of a web-shaped or mat-shaped bearing layer is provided, onto which a foamable second plastic material is applied, and foamed.

15 Claims, 4 Drawing Sheets

PLASTIC PLANAR STRUCTURE COMPRISING A FOAMED UPPER LAYER

BACKGROUND OF THE INVENTION

1. Technical Field

The invention relates to a plastic planar structure having a thickness which is small in comparison with its length and width. The planar structure can be provided as unit goods and in particular can form a floor covering or tub inlay. The invention also, however, relates to semi-finished manufactured products which are for example wound onto a roller as a product web and still have to be fabricated into desired unit goods. A method for manufacturing such a plastic planar structure is also a subject of the invention.

2. Description of the Related Art

Plastic planar structures, such as the invention also relates to among other things, follow from DE 24 14 862. Such planar structures are for use in wet areas, for example as a shower or bath tub inlay, or can be used as a floor covering in baths, including public baths, or in a sauna area. Not least due to their impact sound insulating effect, their durability and simple cleaning, they can also be used in dry areas as floor coverings or in general as a support or underlay, for example also as a table covering.

In order to provide such plastic planar structures with an appealing exterior, the visible surface of the plastic planar structures is generally structured, for example printed or coated in areas. Printing or coating improves the optical impression, but the haptic sensation normally suffers.

SUMMARY OF THE INVENTION

It is an object of the invention to provide a foamed plastic planar structure which has an optically appealing and haptically pleasant surface.

The invention proceeds on the basis of a plastic planar structure which comprises a mat-shaped or web-shaped bearing layer made of plastic foam and an upper layer, also made of plastic foam, which adheres on the bearing layer in a material lock, i.e. is connected to the bearing layer in a material lock. The bearing layer can consist solely of the plastic foam. In preferred embodiments, the bearing layer contains a woven or preferably interlaced inlay which is enveloped by the plastic foam. Although the bearing layer can in principle contain one or more other components, it is in accordance with preferred example embodiments if the bearing layer consists only of the inlay and the plastic foam. What has been said with respect to the bearing layer also applies to the upper layer, wherein however the upper layer consists only of plastic foam in preferred example embodiments. The plastic foam of the bearing layer and the plastic foam of the upper layer are preferably formed from the same polymer, preferably from plasticised PVC or an acrylate. In alternative embodiments, however, the polymers of the two plastic foams can also be different. The plastic foams can not only comprise identical polymers as a base material but can also be identically prepared, i.e. can comprise the same fillers, plasticisers or other aggregates both in terms of type and proportion. In preferred embodiments, however, they differ with regard to their colour, i.e. with regard to the colour additives or their proportional amounts. In the following, the plastic foams are referred to in the plural, even when the two plastic foams are perfectly identical.

The upper layer can cover the bearing layer all-over, but in preferred embodiments the upper layer only covers partial areas of the bearing layer. The partial areas of the bearing layer remaining exposed between the covered partial areas can remain completely exposed, such that they form a part of the surface of the plastic planar structure. Alternatively, however, the surface areas remaining exposed can be completely or partially covered with printing ink, preferably in polychrome printing.

The upper layer is preferably not printed or coated on its surface, but preferably directly forms its part of the surface of the plastic planar structure by itself.

In the case of the upper layer which covers only partial areas of the bearing layer, as is preferred, the surface of the plastic planar structure is structured by the upper layer. The upper layer can in particular be applied in the form of a pattern, a motif or design, or also in the form of a more complex image. By producing a pattern or for example a motif or other type of surface structuring by means of a foam layer, i.e. a foam profile, the spatial impression which for example the pattern or motif imparts can be strengthened as compared to a printed image which is only laminarly applied or a smooth coating. The structuring is advantageously still clearly recognizable at an oblique angle of view. In particular, however, the foamed upper layer produces a more pleasant haptic sensation. The latter is above all advantageous for shower tub inlays and bath tub inlays, but also for floor coverings in wet areas on which people walk barefoot, for example private baths, public indoor swimming pools or sauna areas. Gym mats and other exercise mats can also advantageously be formed in accordance with the invention. Table coverings are also preferred objects of the invention.

The plastic material of the bearing layer and the plastic material of the upper layer are fused together in a boundary layer which is thin in comparison with the two layers, by foaming the plastic materials of the two layers or by foaming only the plastic material of the upper layer. The bearing layer and the upper layer can already clearly be optically distinguished from each other, in most cases even with the naked eye. If the two layers each exhibit a different colour, the boundary layer forms a sharp dividing line between the two colours. If, as is preferred, the surface of the plastic planar structure is structured by means of the upper layer, for example by applying the upper layer in the form of a motif or pattern, the upper layer forms elevations on the bearing layer which are immediately recognizable with the naked eye and clearly differ from any unevenness in the bearing layer due to their greater difference in height. The upper layer can also differ from the bearing layer in terms of its structure, by exhibiting a greater or smaller degree of porosity than the bearing layer. On the other hand, however, it is also in accordance with preferred example embodiments if the degree of porosity and therefore the average density of the two plastic foams is identical. If the plastic foams have the same density, but also if they have different densities, the density of the two plastic foams preferably measures at least 0.2 $g/cm^3$ and preferably at most 0.4 $g/cm^3$. In particularly preferred embodiments, the plastic foams each have an average density of about 0.25 $g/cm^3$.

Since the plastic material of the upper layer is foamed on the bearing layer, a particularly intimate and solid connection between the two layers is also obtained. Detaching the upper layer is practically impossible.

The bearing layer is preferably closed. In alternative embodiments, however, it can also be provided with gaps, for example in accordance with European patent application No. 05 000 323.5 or German patent application No. 10 2005 049 063.8. In such embodiments, the gaps are preferably also retained in the planar areas of the plastic planar structure which are covered by the upper layer.

The bearing layer can advantageously be compressed on its lower side, for example by being embossed, such that its lower side comprises a thin skin forming the surface there, in which the density of the plastic material forming the plastic foam of the bearing layer is significantly higher as compared to the plastic foam. With respect to compressing on the lower side, reference is again made to European patent application No. 05 000 323.5. If the plastic planar structure comprising the compressed lower side is placed directly on a foundation, for example on a floor or a piece of furniture or a shower or bath tub, the compression—preferably, the embossment—achieves a particularly strong resistance to slipping. The compression also increases the impermeability to the passage of gas. This property is for example advantageous if the plastic planar structure is a neck cushion or head rest and, for this purpose, envelops a cavity which is pressurised as compared to the ambient pressure. The plastic planar structure can thus for example envelop a foam core, wherein the enveloped cavity with the foam core is filled with pressurised air. Such a design is advantageous for neck cushions in bath tubs or for head rests in general.

In preferred embodiments, the bearing layer has an at least substantially uniform thickness over its entire surface. In such embodiments, any variations in thickness are at most caused by the shape of an enveloped inlay, if one is provided as is preferred, and by the foaming process. If the bearing layer forms a closed surface, as is preferred, the variation in thickness preferably measures at most ±10% relative to an average thickness. The thickness of the bearing layer should measure at least 1.5 mm; more preferably, it measures at least 2.5 mm. On the other hand, the thickness should not exceed 15 mm; more preferably, the bearing layer is at most 10 mm thick. The thickness is measured between two plane surfaces which for measurement are placed onto the upper side and the lower side of the bearing layer without exerting pressure.

The thickness of the upper layer, measured between the exposed surface and a thin boundary layer formed with the bearing layer and in which the polymers of the two layers are fused together, is preferably at most half as large as the thickness of the bearing layer; even more preferably, the upper layer is at most a third as thick as the bearing layer. In preferred example embodiments, the thickness of the upper layer is selected from the range between 0.5 and 3 mm.

The plastic planar structure is preferably manufactured in a continuous method as a web product. The bearing layer can also be manufactured beforehand in a continuous method as a web product onto which the plastic material of the upper layer is applied and then foamed. However, it is in accordance with preferred example embodiments if the bearing layer and the upper layer are foamed in-line. If the two plastic materials are foamed in an in-line method, it is possible to foam the plastic material of the bearing layer, stop the foaming process, and then apply the plastic material of the upper layer onto the already foamed bearing layer and foam it too, in-line. In particularly preferred method embodiments, however, the two plastic materials, i.e. the plastic material of the bearing layer and the plastic material of the upper layer, are foamed simultaneously. In this method variant, the material of the bearing layer is preferably gelled at a temperature of at least 100° C., but not yet foamed, before the plastic material of the upper layer is applied.

If the material of the bearing layer is to be compressed on its lower side, the compressing step is preferably performed after the plastic material of the upper layer has been foamed, advantageously in-line.

Preferred features are also disclosed in the sub-claims and combination of them. The features described in the sub-claims and the features described above can supplement each other reciprocally.

BRIEF DESCRIPTION OF THE DRAWINGS

Example embodiments of the invention are explained below on the basis of figures. Features disclosed by the example embodiments, each individually and in any combination of features, advantageously develop the subjects of the claims and also the embodiments described above. There is shown:

DETAILED DESCRIPTION OF THE PREFERRED EMBODIMENTS

Figure 1:
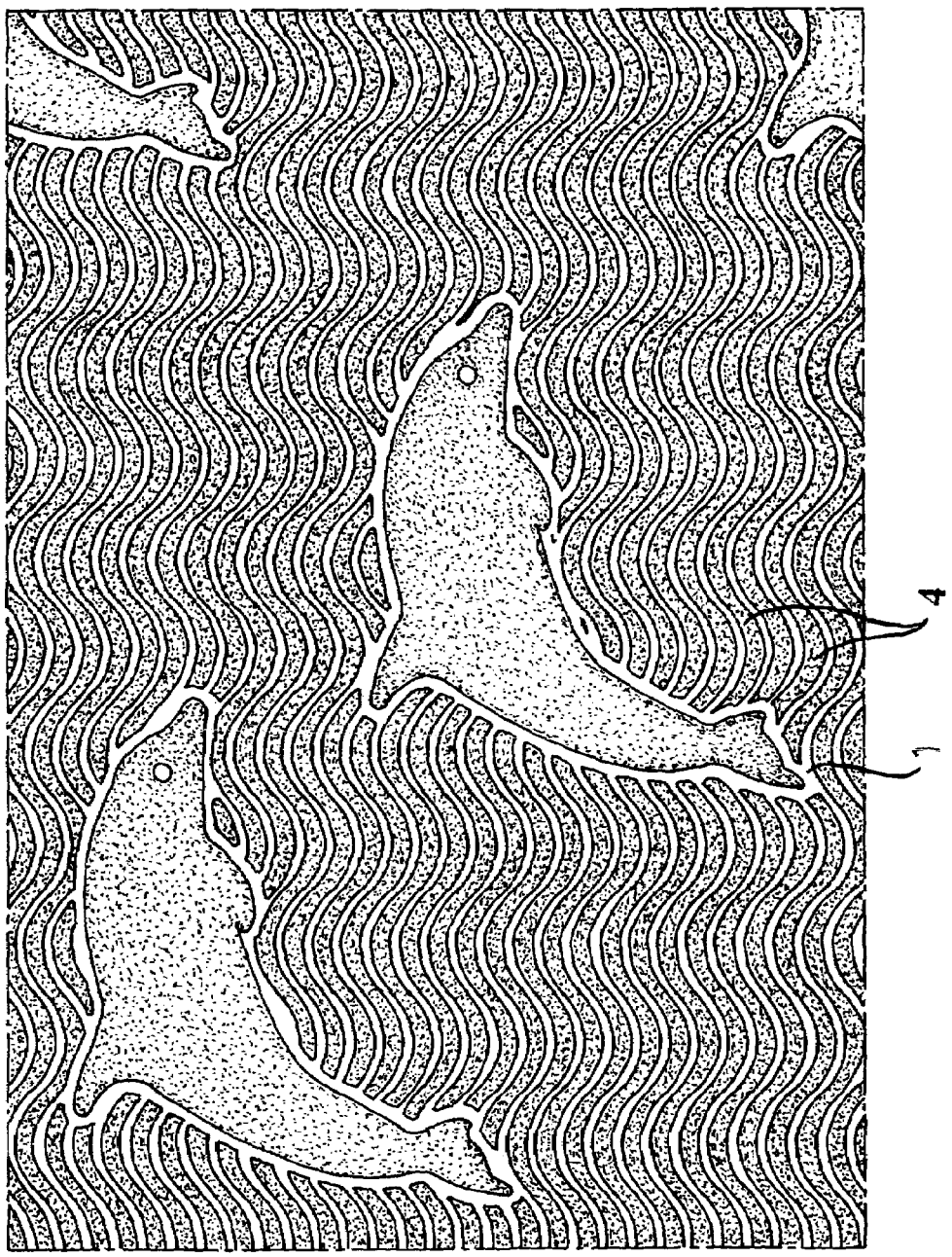
FIG. 1 a plastic planar structure with a motif.

FIG. 1 shows a plastic planar structure of a first example embodiment, in a top view onto an upper side. The plastic planar structure is a bath tub inlay or shower tub inlay and is provided on its lower side opposite the upper side (not shown) with a number of suckers which hold the planar structure on the bottom of the shower or bath tub during use. If the planar structure forms a floor covering, for example for baths, it does not comprise the suckers but is rather compressed, for example embossed, on its lower side in preferred embodiments.

The plastic planar structure consists of a bearing layer 1 which forms the lower side and a part of the exposed surface of the upper side of the plastic planar structure, and an upper layer 4 which is arranged on the surface of the bearing layer 1 and is fused with the bearing layer 1 in a thin boundary layer formed between the bearing layer 1 and the upper layer 4. The upper layer 4 is applied in the form of a motif consisting of stylised dolphins and waves, such that the pictorial impression is created of dolphins jumping out of the water. The upper layer 4 covers the predominant part of the surface of the bearing layer 1.

Figure 2:
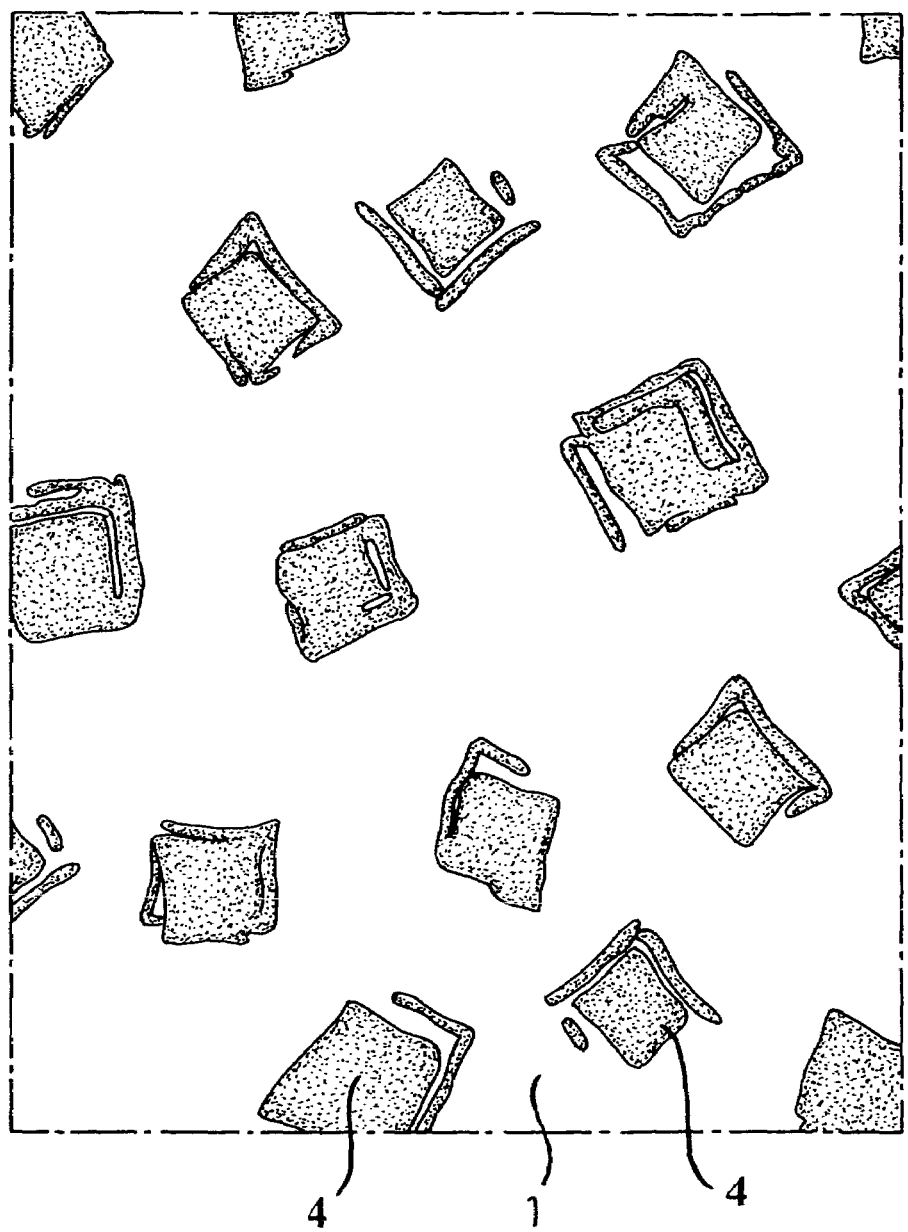
FIG. 2 a plastic planar structure with a pattern.

FIG. 2 shows a plastic planar structure of a second example embodiment which only differs from the first example embodiment with regard to the upper layer 4. The bearing layer 1 corresponds to the bearing layer 1 of the first example embodiment. The upper layer 4 forms an irregular pattern of rhombic elevations on the bearing layer 1. The upper layer 4 covers less than half of the upper side of the bearing layer 1. Apart from the surface coverage and the pictorial impression, however, the plastic planar structures of the two example embodiments are identical.

Figure 3:
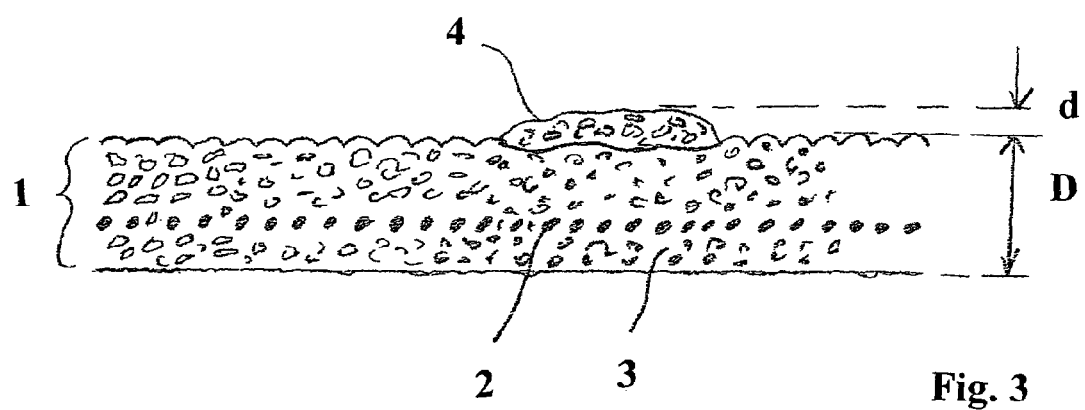
FIG. 3 the plastic planar structure of FIG. 2, in a cross-section.

FIG. 3 shows a cross-section through the plastic planar structure of FIG. 2, though this is also representative of the plastic planar structure of FIG. 1. The bearing layer 1 consists of an inlay 2 and a plastic foam 3. The inlay 2 is embedded in the plastic foam 3, i.e. the plastic foam 3 enveloped the inlay 2. The plastic foam 3 is a foamed, plasticised PVC. The inlay 2 is a laminar, textile, thin interlace of thin threads, preferably polyester threads. The inlay 2 preferably only consists of a single layer of an interlace. The inlay 2 consists of threads which in the top view form rows and lines perpendicular to them, and also consists of diagonal threads which are also at least substantially parallel to each other. The threads of the rows, lines and diagonals are meshed in points of intersection.

Instead of an interlace or other meshed product, a fabric could in principle also form the inlay 2. The distances between the threads of the rows and the distances between the threads of the lines are preferably uniform and selected from the range between 0.1 and 2 mm. In preferred embodiments, the distances between the diagonal threads are greater than the distances of the threads of the rows and lines. In alternative embodiments, the diagonal threads may be omitted.

The plastic foam 3 of the bearing layer 1 exhibits a density of preferably at least 0.2 and preferably at most 0.4 g/cm$^3$. The plastic foam of the upper layer 4 preferably also exhibits a density from this range.

The plastic foam 3 of the bearing layer 1 and the plastic foam of the upper layer 4 differ only with regard to their colour—in the example embodiments, only in the brightness of their colours—by the bearing layer 1 being brighter or darker than the upper layer 4. Alternatively, however, the bearing layer 1 and the upper layer 4 can have different shades or saturations or can have perfectly identical colours. A pattern or motif would still be recognizable, even if the colours were perfectly identical, due to the three-dimensional extent of the upper layer 4.

The thickness D of the bearing layer 1 and the thickness d of the upper layer 4 are also indicated in FIG. 3. For a thin product, the thickness D measures for example 3 mm±0.5 mm and for a voluminous product for example 8±1 mm. The thickness d is selected from the range of 1 to 2 mm for both products.

Figure 4:
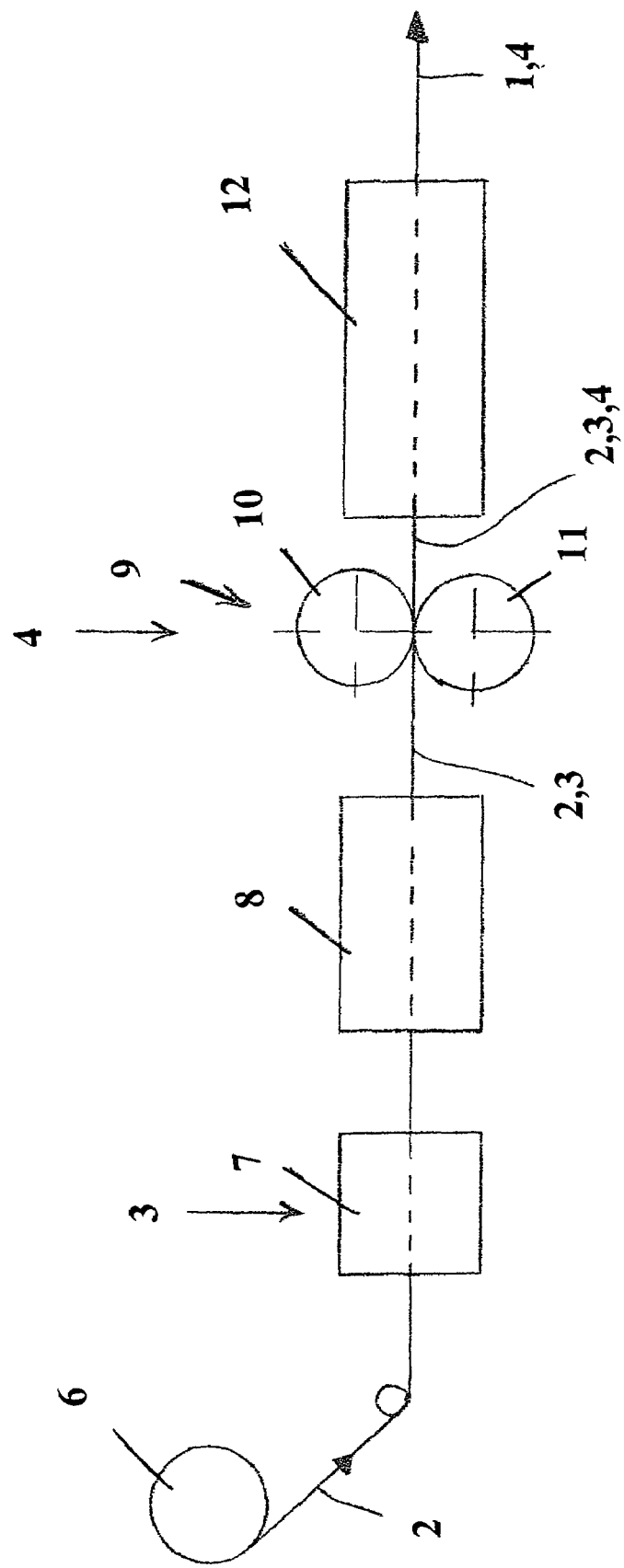
FIG. 4 an installation for manufacturing the plastic planar structure.

A preferred method for manufacturing the plastic planar structure is explained below on the basis of FIG. 4 which shows a manufacturing installation in which all the components of the planar structure are brought together and processed into a planar structure in accordance with the invention, in-line.

The installation includes an unwinding means 6 for the inlay 2, an applying means 7 for applying the foamable plastic material 3 of the bearing layer 1, a gelling oven 8, an applying means 9 for applying the foamable plastic material 4 of the upper layer, and a foaming oven 12. The inlay 2 is wound on a web roller accommodated in the unwinding means 6, continuously unwound and conveyed to the applying means 7. The plastic material 3 of the bearing layer 1 is applied by means of the applying means 7. The paste-like plastic material 3 is preferably plasticised PVC, to which in particular an expanding agent and preferably a plasticiser and other additives have been added. The proportion of PVC preferably measures at least 45% by weight. The plastic material 3 breaks through the inlay 2 and already envelops the inlay 2 at least substantially immediately after it is applied. The composite web 2, 3 of inlay 2 and paste-like plastic material 3 thus formed is gelled in the gelling oven 8 at a temperature from the range of preferably 130° C. to 160° C. and continuously conveyed to the applying means 9. The applying means 9 includes a serigraphic roller 10 and a counter roller 11. The gelled web is conveyed through the gap between the two rollers 10 and 11, wherein the paste-like, foamable plastic material 4 of the upper layer is applied onto the upper side of the composite web 2, 3, in accordance with the desired pattern or motif, by means of the serigraphic roller 10. The composite web 2, 3, 4, which is then already complete in terms of material, is continuously conveyed on through the foaming oven 12, where it is foamed at an increased temperature, as compared to the gelling temperature, of preferably at least 170° C. The plastic material 3 and the plastic material 4 are thus foamed simultaneously. The foaming process is stopped in a controlled manner by cooling. The plastic planar structure 1, 4 thus obtained as a web product is wound onto a roller and supplied for subsequent processing. In alternative method embodiments, the web product is cut to length, still in-line, and dispatched in the form of a mat and supplied for subsequent processing.

The composite web 2, 3 is preferably significantly cooled down or left to cool down before the plastic material 4 is applied, such that it preferably has a temperature from the range of 40° C. to 80° C. as it passes through the applying means 9. The distance between the gelling oven 8 and the applying means 9 is preferably selected, and the conveying speed of the web 2, 3 preferably set, such that the gelled plastic material 3 has cooled by itself down to a temperature from the temperature range cited, when the plastic material 4 is applied.

As already mentioned, the polymer or polymers of the two plastic materials can in particular be PVC or an acrylate. PUR, natural rubber, synthetic rubber, PMMA, unsaturated polyesters and also other pastable thermoplasts in general may also alternatively or, as applicable, additionally be considered.

The invention claimed is:

1. A plastic planar structure having a visual design, comprising:
    a bearing layer which contains plastic foam, the bearing layer defining a lower surface of the plastic planar structure wherein said bearing layer comprises upper and lower surfaces with the lower surface of the bearing layer comprising a thin skin of said plastic foam which is compressed and forms the lower surface of the plastic planar structure; and
    an upper layer, also containing plastic foam, which adheres on the bearing layer in a material lock wherein the upper layer only covers partial areas of the bearing layer and wherein the upper layer forms a portion of an upper surface of the plastic planar structure in the partial areas and the upper surface of the bearing layer forms a portion of the upper surface of the plastic planar structure in intermediate areas remaining exposed, and
    wherein the plastic foam of the bearing layer and the plastic foam of the upper layer each have substantially the same average density, and
    wherein the plastic foam of the bearing layer and the plastic foam of the upper layer each exhibit a different colour.

2. The plastic planar structure according to claim 1, wherein the layers are fused together.

3. The plastic planar structure according to claim 1, wherein the upper layer defines the visual design in the form of an image, motif, design or pattern on the bearing layer.

4. The plastic planar structure according to claim 1, wherein the bearing layer forms a closed surface.

5. The plastic planar structure according to claim 1, wherein the layers each have an at least substantially uniform thickness over their entire surface and the bearing layer is at least twice as thick as the upper layer.

6. The plastic planar structure according to claim 1, wherein the bearing layer exhibits an at least substantially uniform thickness of at least 1.5 mm over its surface.

7. The plastic planar structure according to claim 1, wherein the bearing layer exhibits an at least substantially uniform thickness of at most 15 mm over its surface.

8. The plastic planar structure according to claim 1, wherein the bearing layer contains a meshed product or a fabric as an inlay and the plastic foam of the bearing layer envelops the inlay.

9. The plastic planar structure according to claim 1, wherein the upper layer consists of plastic foam.

10. The plastic planar structure according to claim 1, wherein the plastic foam of the bearing layer and the plastic foam of the upper layer are formed from the same polymer.

11. The plastic planar structure according to claim 10, wherein the polymer is PVC or an acrylate.

12. The plastic planar structure according to claim 1, wherein the bearing layer is additionally printed with at least one colour.

13. The plastic planar structure according to claim 1, wherein the bearing layer is embossed on its lower side.

14. The plastic planar structure according to claim 1, wherein the average density of both the plastic foam of the bearing layer and the plastic foam of the upper layer is between 0.2 g/cm$^3$ and 0.4 g/cm$^3$.

15. The plastic planar structure according to claim 1, wherein the average density of both the plastic foam of the bearing layer and the plastic foam of the upper layer is approximately 0.25 g/cm$^3$.

* * * * *

UNITED STATES PATENT AND TRADEMARK OFFICE
CERTIFICATE OF CORRECTION

PATENT NO. : 7,776,431 B2  Page 1 of 1
APPLICATION NO. : 11/347436
DATED : August 17, 2010
INVENTOR(S) : Uwe Stockheim It is certified that error appears in the above-identified patent and that said Letters Patent is hereby corrected as shown below:

On the Title Page, Item (12), second line should read:

Stockheim

On the Title Page, Item (75) should read:

Inventor:   Uwe Stockheim, Wanfried-Heldra (DE)

Signed and Sealed this

Fifth Day of October, 2010

David J. Kappos
*Director of the United States Patent and Trademark Office*